No. 654,079. Patented July 17, 1900.
V. H. TALTON.
SEED COTTON CLEANER AND FEEDER.
(Application filed Dec. 6, 1899.)
(No Model.) 2 Sheets—Sheet 1.
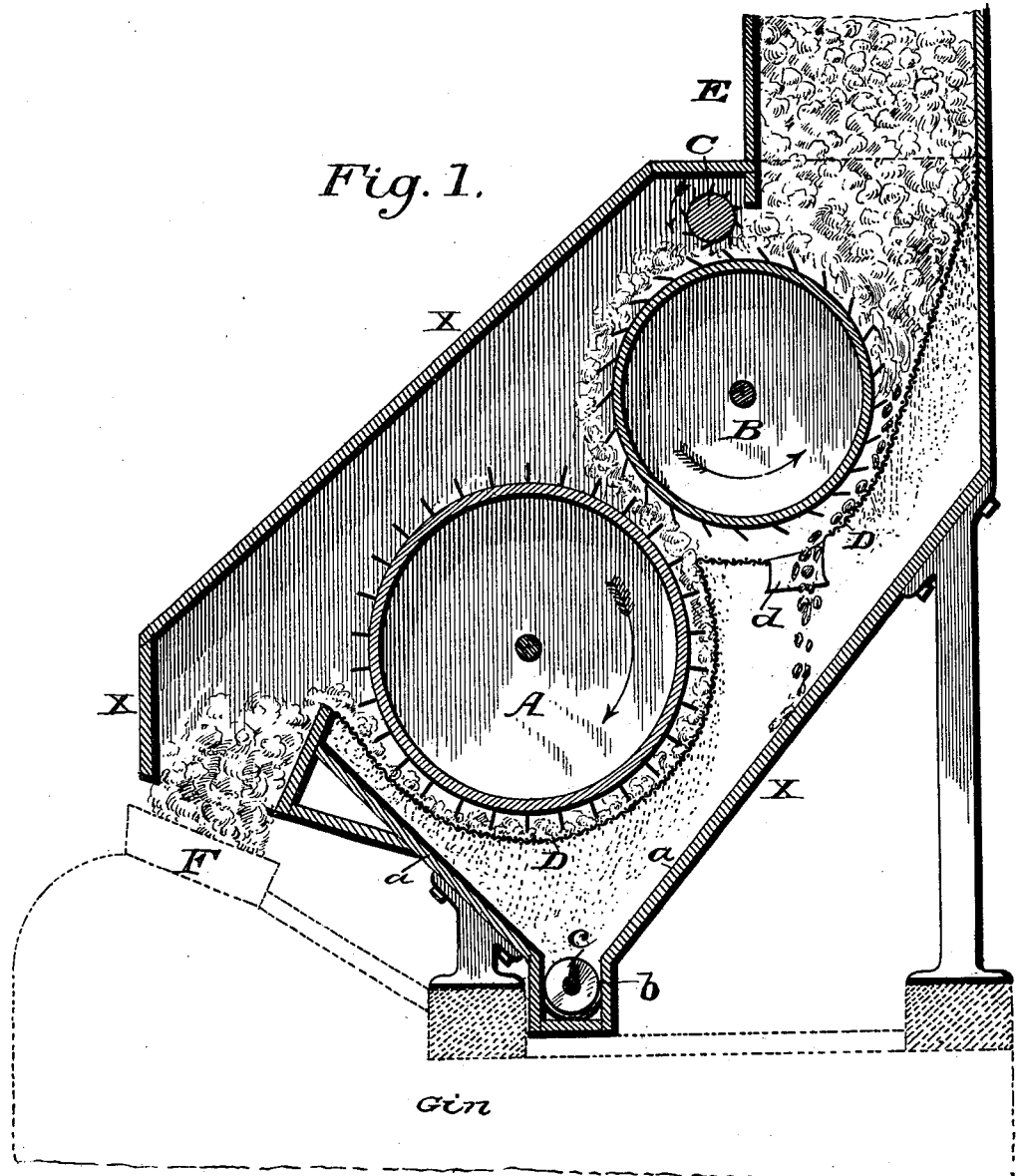

No. 654,079. Patented July 17, 1900.
V. H. TALTON.
SEED COTTON CLEANER AND FEEDER.
(Application filed Dec. 6, 1899.)
(No Model.) 2 Sheets—Sheet 2.
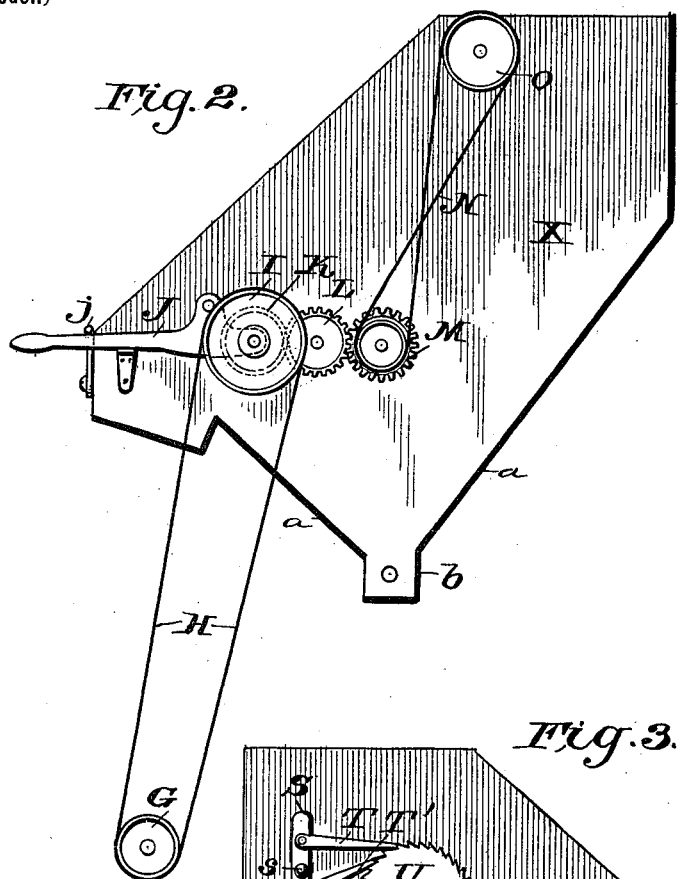
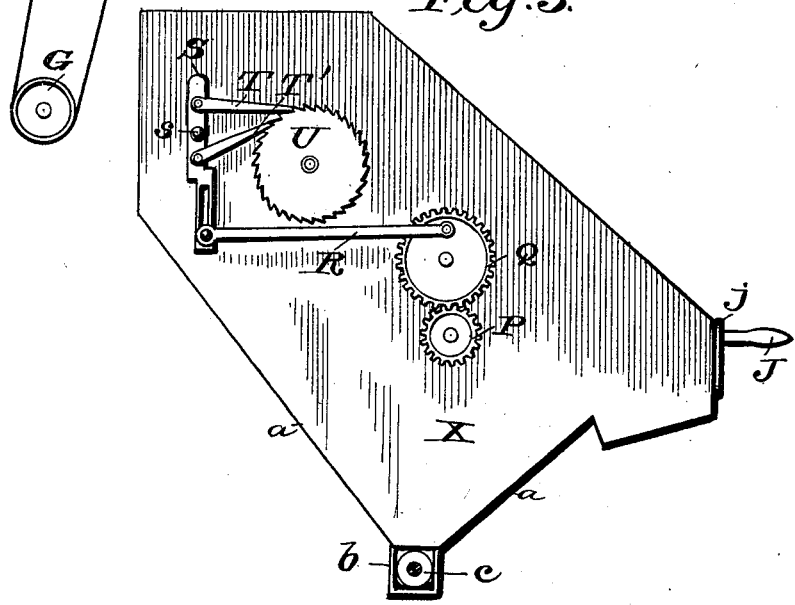
WITNESSES:
Jos. A. Ryan
Amr W Hart
INVENTOR
Vander H. Talton.
BY Munn & Co
ATTORNEYS

UNITED STATES PATENT OFFICE.

VANDER H. TALTON, OF COLUMBUS, GEORGIA, ASSIGNOR TO THE F. H. LUMMUS SONS COMPANY, OF SAME PLACE.

SEED-COTTON CLEANER AND FEEDER.

SPECIFICATION forming part of Letters Patent No. 654,079, dated July 17, 1900.

Application filed December 6, 1899. Serial No. 739,417. (No model.)

*To all whom it may concern:*

Be it known that I, VANDER H. TALTON, residing at Columbus, in the county of Muscogee and State of Georgia, have invented a new and useful Improvement in Seed-Cotton Cleaners and Feeders, of which the following is a specification.

It is the object of my invention to provide an improvement in the class of combined seed-cotton cleaners and feeders for gins, the same being in practice arranged between the gins and the elevator-chutes.

My apparatus is adapted to remove from the seed-cotton all extraneous or foreign substances—such as dust, dirt, sand, pebbles, nails, clods, or locks of immature cotton—and at the same time even and feed the cotton uniformly to the gin, so that the desired action of the latter is facilitated. Heretofore in this class of cleaners and feeders an endless traveling apron has been commonly employed in connection with one or more toothed cylinders and a screen arranged under one of them for effecting separation of foreign substances from the cotton. I dispense with such apron and employ in place of it a rotatable cylinder having tangential teeth and which is arranged in connection with another, but more rapidly rotated, toothed cylinder, whereby the apparatus is reduced in size and made less expensive, as well as rendered more efficient for its purpose.

The details of construction, arrangement, and operation of the invention are as follows, reference being had to the accompanying drawings, in which—

Figure 1 is a vertical transverse section of my improved cotton cleaner and feeder. Fig. 2 is a side view of the same, and Fig. 3 is a view of the opposite side of the apparatus.

The casing X of the cleaner and feeder is arranged between the chute E and gin proper, F, and supported upon the latter. As shown in Fig. 1, the movable parts within such casing X are the rotatable toothed cylinders A and B and the flanged roller C, all arranged horizontally. A screen D is fixed in place behind and below the cylinders A B and has two curves, whereby it conforms to the peripheries of said cylinders and projects into the space between them.

The feeder-cylinder B is arranged above and slightly to the right of the cleaner-cylinder A, while the flanged roller C is located above the feeder B. The latter is just below the mouth of the chute E, so that the seed-cotton is delivered from the latter directly upon it. The feeder-cylinder B rotates intermittently, and the roller C rotates in the same direction, but continuously. The lower or cleaner cylinder A rotates continuously, but in a direction opposite that of the feeder B and with more than twice the speed of the latter. These several directions of rotation are indicated by arrows in Fig. 1.

As has been already in part indicated, the function of the roller C is to retard the feed of cotton to a due degree, so that it shall be fed to the gin in the desired quantity. Its lengthwise flanges are set tangentially, or at least at sufficient transverse inclination, to enable them to pass in contact with the cotton without taking up and rolling the same upon itself. The cylinder B feeds the cotton intermittently and in a comparatively-thin layer, and its fibers are straightened out more or less. The cylinder B also serves to dislodge from the cotton the larger and heavier foreign substances that may be held therein—such as stones, clods, &c.—which then fall upon the upper section of the screen D and pass out through the transverse slot *d* therein, as illustrated in Fig. 1.

The cotton passes over the feeder-cylinder B and onto and around the lower cylinder A and is by the latter thoroughly cleaned and its fibers further stretched and arranged in uniformity. As indicated in Fig. 1, the cotton passes between the cylinder A and screen D and is delivered therefrom to the gin at F.

It will be noted that the feeder-cylinder B is provided with sharp tangential teeth, so that the removal of cotton therefrom is greatly facilitated at the point of nearest proximity of the two cylinders A B. Such operation is further aided by the intermittent rotation of the cylinder B, whereby it is allowed a succession of rests or dwells, during which the cotton is drawn completely off its teeth by the continuously and rapidly rotating cleaner-cylinder A.

By use of the cleaner-cylinder arranged as herein shown and described a traveling apron is rendered unnecessary and space is economized, while the desired result is accomplished in a more perfect manner.

It will be noted that the arrangement of the tangentially-toothed cylinder B relative to the chute E enables it to remove or transfer to the cleaner A all the cotton delivered by the chute—an operation and result which are not attained by the usual arrangement of a traveling apron and one or more toothed cylinders. It will be further noted that the screen surface or area is a relatively-large one, being more than double that usually available in this class of cleaners and feeders, and that the cotton is therefore more thoroughly cleaned.

As shown in Fig. 1, the dust, sand, stones, &c., dislodged from the cotton and passing through the screen D fall upon the inclined bottom portions $a$ of the casing X and slide downward into a trough $b$, containing an endless screw conveyer $c$, by which they are removed from the casing into any suitable receptacle.

The means for operating the cylinders A B and roller C are as follows, the same being arranged on opposite sides of the casing X: The power is derived from the gin-shaft G, Fig. 2, by means of a belt H, which runs on a pulley I, that is keyed on a stub-shaft carried by a pivoted lever J. A gear K is secured to and rotates with said pulley I and meshes with another one, L, which in turn engages a third gear M. The last is keyed on the shaft of the cleaner-cylinder A alongside a pulley, whence a crossed belt N runs to a pulley O on the shaft of the retarding-roller C.

When the lever J is locked by a hook $j$ in the position shown in Fig. 2, the cleaner and feeder mechanism operates along with the gin; but by releasing the handle end of said lever the gear K is thrown out of engagement with gear L, and the mechanism thereby thrown out of action.

In Fig. 3 a gear P is shown arranged on the shaft of cylinder A and meshing with a large one Q, which runs loose on a stub-shaft set in the casing X. A rod R is pivoted eccentrically to the gear Q, and its opposite end has an adjustable pivotal connection with the longer arm of a vertical lever S. The latter oscillates on a pivot and has two push-pawls T and T', which engage a ratchet-wheel U, that is keyed on the shaft of cylinder B.

It is apparent that rotation of the cylinder A with its gear P will cause a slower rotation of the gear Q and that the latter will thereby oscillate the lever S, whose pawls will in consequence impart an intermittent rotation to wheel U, and thereby to the feeder-cylinder B.

Having thus described my invention, what I claim, and desire to secure by Letters Patent, is—

1. The improved cotton cleaner and feeder, comprising the casing X, the toothed, intermittently-rotating cylinder B, and the toothed cylinder A, which is arranged parallel to the former, and rotated continuously and at a higher rate of speed, and a screen arranged behind the two cylinders and extending above the upper one and provided with the opening $d$ directly beneath such upper cylinder, to operate substantially as shown and described.

2. The improved cotton cleaner and feeder, comprising a toothed, intermittently-rotating cylinder B, and a toothed continuously-rotating cylinder A, arranged parallel and in due proximity to each other, the two cylinders rotating in opposite directions and the first-named one having teeth arranged tangentially, and a screen arranged behind both cylinders and extending above the upper cylinder, substantially as shown and described.

3. The improved cotton cleaner and feeder, comprising an intermittently-rotating cylinder B having teeth arranged tangentially, a second cylinder A which is continuously rotated in a direction opposite the first-named cylinder, the two being arranged in proximity, the continuously-rotating roller C, having lengthwise flanges, and arranged adjacent to the upper or feeder cylinder, and a screen located behind said cylinders and curved conformably thereto, substantially as shown and described.

VANDER H. TALTON.

Witnesses:
 EDGAR D. BURTS,
 W. G. LOVE.